US010059151B2

(12) United States Patent
Araki (10) Patent No.: US 10,059,151 B2
(45) Date of Patent: Aug. 28, 2018

(54) HEAVY-DUTY PNEUMATIC TIRE

(71) Applicant: BRIDGESTONE CORPORATION, Tokyo (JP)

(72) Inventor: Kenji Araki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 126 days.

(21) Appl. No.: 15/110,035

(22) PCT Filed: Dec. 12, 2014

(86) PCT No.: PCT/JP2014/006216
§ 371 (c)(1),
(2) Date: Jul. 6, 2016

(87) PCT Pub. No.: WO2015/107599
PCT Pub. Date: Jul. 23, 2015

(65) Prior Publication Data
US 2016/0332488 A1   Nov. 17, 2016

(30) Foreign Application Priority Data

Jan. 17, 2014   (JP) .................................. 2014-007060

(51) Int. Cl.
*B60C 11/03*   (2006.01)
(52) U.S. Cl.
CPC ... *B60C 11/0311* (2013.01); *B60C 2011/0346* (2013.01); *B60C 2011/0348* (2013.01);
(Continued)

(58) Field of Classification Search
CPC ..... B60C 2011/0346; B60C 2011/0348; B60C 2011/0351; B60C 2011/0353;
(Continued)

(56) References Cited

U.S. PATENT DOCUMENTS 9,302,547 B2 *   4/2016   Tanaka ................ B60C 11/0306
9,796,216 B2 *   10/2017   Todoroki ............ B60C 11/0306
(Continued)

FOREIGN PATENT DOCUMENTS

CN   102189902 A   9/2011
CN   102233795 A   11/2011
(Continued)

OTHER PUBLICATIONS

JP 2010-125999 machine translation as provided by https://dossier1.j-platpat.inpit.go.jp/ on Dec. 19, 2017 (Year: 2010).*
(Continued)

*Primary Examiner* — Jodi C Franklin
(74) *Attorney, Agent, or Firm* — Sughrue Mion, PLLC (57) ABSTRACT

A heavy-duty pneumatic tire having block land portions in a tread surface can reduce the tire circumferential shearing strain and heat generation in the tread portion to prevent the separation failure between the tread rubber and the belt more effectively. A heavy-duty pneumatic tire has, in a tread surface, blocks defined by a plurality of circumferential main grooves each continuously extending in a tire circumferential direction and a plurality of transverse grooves each communicating between circumferential main grooves adjacent in a tire width direction, wherein in a tire widthwise area that centers on a tire equator and whose width in the tire width direction is 50% of a tread width: at least one of the blocks has a block partitioning groove that is open to each of transverse grooves defining the block and is shallower than the circumferential main grooves, to divide the block into a plurality of small blocks; and at least one of the small blocks has a block auxiliary groove that is open to the block partitioning groove at one end and open to a corresponding circumferential main groove or transverse groove at an other end and is shallower than the circumferential main grooves.

13 Claims, 4 Drawing Sheets

(52) U.S. Cl.
CPC ............... *B60C 2011/0351* (2013.01); *B60C 2011/0353* (2013.01); *B60C 2011/0355* (2013.01); *B60C 2011/0365* (2013.01); *B60C 2011/0367* (2013.01); *B60C 2200/065* (2013.01)

(58) Field of Classification Search
CPC ..... B60C 2011/0355; B60C 2011/0365; B60C 2011/0367; B60C 2200/065
See application file for complete search history.

(56) References Cited

U.S. PATENT DOCUMENTS

| | | | | |
|---|---|---|---|---|
| 9,931,893 | B2* | 4/2018 | Nomura | B60C 11/13 |
| 2007/0199633 | A1 | 8/2007 | Hayashi | |
| 2011/0259494 | A1* | 10/2011 | Shibano | B60C 11/0306 152/209.22 |
| 2012/0118461 | A1* | 5/2012 | Matsuzawa | B60C 11/0311 152/209.18 |
| 2012/0241061 | A1 | 9/2012 | Maehara | |
| 2013/0192732 | A1* | 8/2013 | Itoi | B60C 11/11 152/209.8 |
| 2013/0276947 | A1* | 10/2013 | Oogane | B60C 11/04 152/209.18 |
| 2013/0333816 | A1* | 12/2013 | Oono | B60C 11/042 152/209.18 |
| 2014/0000776 | A1 | 1/2014 | Nakamura | |
| 2014/0034207 | A1* | 2/2014 | Takahashi | B60C 9/28 152/548 |
| 2014/0130949 | A1* | 5/2014 | Maehara | B60C 11/033 152/209.8 |
| 2014/0311647 | A1* | 10/2014 | Matsumura | B60C 9/20 152/537 |
| 2015/0075689 | A1* | 3/2015 | Fukuda | D07B 1/0613 152/451 |
| 2015/0210121 | A1* | 7/2015 | Sanae | B60C 11/0304 152/209.8 |
| 2015/0321521 | A1* | 11/2015 | Ogane | B60C 11/01 152/209.22 |
| 2015/0352903 | A1* | 12/2015 | Ookawa | B60C 11/0306 152/209.18 |
| 2015/0352906 | A1* | 12/2015 | Nomura | B60C 11/0316 152/209.18 |
| 2016/0221397 | A1* | 8/2016 | Maehara | B60C 11/0306 |
| 2016/0311264 | A1* | 10/2016 | Uzawa | B60C 11/11 |

FOREIGN PATENT DOCUMENTS

| | | |
|---|---|---|
| CN | 204506359 U | 7/2015 |
| EP | 2371584 A2 | 10/2011 |
| EP | 2383127 A2 | 11/2011 |
| JP | 2008-155817 A | 7/2008 |
| JP | 2010-125998 A | 6/2010 |
| JP | 2010-125999 A | 6/2010 |
| JP | 2011-195045 A | 10/2011 |
| JP | 2011-230643 A | 11/2011 |
| JP | 2012-153157 A | 8/2012 |
| JP | 2012-171591 A | 9/2012 |
| JP | 2012-201253 A | 10/2012 |
| WO | 2006/001202 A1 | 1/2006 |

OTHER PUBLICATIONS

International Search Report of PCT/JP2014/006216 dated Mar. 3, 2015.

* cited by examiner

HEAVY-DUTY PNEUMATIC TIRE

CROSS REFERENCE TO RELATED APPLICATIONS

This application is a National Stage of International Application No. PCT/JP2014/006216 filed Dec. 12,2014 claiming priority based on Japanese Patent Application No. 2014-007060, filed Jan. 17, 2014, the contents of which are incorporated herein by reference in their entirety.

TECHNICAL FIELD

The disclosure relates to a heavy-duty pneumatic tire having, in its tread surface, blocks defined by a plurality of circumferential main grooves each continuously extending in the tire circumferential direction and a plurality of transverse grooves each communicating between circumferential main grooves adjacent in the tire width direction.

BACKGROUND

This type of tire for use in dump trucks and the like is used in an environment where the road surface is in poor condition such as a construction site or a mine. Accordingly, contact with pebbles, rocks, etc. on the road often causes a deep cut in the tread portion.

In the case where the tread portion receives such a deep cut, the separation between the tread rubber and the belt located on the tire radial inner side of the tread rubber is more likely to develop in the tire circumferential direction from the initial cut when the tire circumferential shearing strain in the tread portion during tire use is greater or the tread temperature is higher.

For example, Patent Literature (PTL) 1 discloses the following tire to suppress the heat generation of the tire center portion. A center block row is formed in the tread portion by circumferential grooves and lateral grooves, and each block constituting the center block row has a block groove one end of which is open to the lateral groove adjacent to the block on one side in the tire circumferential direction and the other end of which is open to the lateral groove adjacent to the block on the other side in the tire circumferential direction.

CITATION LIST

Patent Literature

PTL 1: JP 2010-125999 A

SUMMARY

Technical Problem

The tire described in PTL 1 is expected to have improved heating durability. However, considering the fact that the tire use conditions in construction sites, mines, etc. have become increasingly harsher, it is desirable to prevent the tire failure due to tire heat generation more effectively.

Moreover, with the rising demand for environmental protection in recent years, tires for use in construction sites, mines, etc. are also required to have longer life, and there is a need for a tire that can prevent the aforementioned separation failure deriving from the cut in the tread portion more effectively.

It could therefore be helpful to provide a heavy-duty pneumatic tire that can suppress the tire circumferential shearing strain and heat generation in the tread portion to prevent the separation failure between the tread rubber and the belt more effectively.

Solution to Problem

We provide the following:

(1) A heavy-duty pneumatic tire according to the disclosure has, in a tread surface, blocks defined by a plurality of circumferential main grooves each continuously extending in a tire circumferential direction and a plurality of transverse grooves each communicating between circumferential main grooves adjacent in a tire width direction, wherein in a tire widthwise area that centers on a tire equator and whose width in the tire width direction is 50% of a tread width: at least one of the blocks has a block partitioning groove that is open to each of transverse grooves defining the block and is shallower than the circumferential main grooves, to divide the block into a plurality of small blocks; and at least one of the small blocks has a block auxiliary groove that is open to the block partitioning groove at one end and open to a corresponding circumferential main groove or transverse groove at an other end and is shallower than the circumferential main grooves.

With such a structure, the tire circumferential shearing strain in the tread portion is suppressed and also the heat generation in the tread portion is reduced to avoid an increase in tread temperature, thus preventing the development of the separation between the tread rubber and the belt. As a result, the tire life until the tire fails can be extended even in the case where the tread portion of the tire receives a deep cut.

Here, the "tread surface" is the outer circumferential surface of the whole tire, which comes into contact with the road surface when the tire attached to an applicable rim and filled to a prescribed internal pressure rolls in the state of being placed under a load corresponding to a maximum load capability. The "tread ground contact edge" is the tread widthwise outermost position of the tread surface. The "tread width" is the width of the tread between the ground contact edges in the tire width direction.

The depth of each type of groove is determined by measuring, in parallel with the tire radial direction, the distance from the groove opening position at which the groove is open to the tread surface to the groove bottom position, in the state where the tire is attached to the applicable rim, filled to the prescribed internal pressure, and placed under no load.

The "applicable rim" is an approved rim ("measuring rim" in ETRTO Standards Manual, "design rim" in TRA Year Book) in applicable size described in an effective industrial standard in areas where tires are produced or used, such as JATMA Year Book in Japan, ETRTO Standards Manual in Europe, or TRA Year Book in the United States. The "prescribed internal pressure" is the air pressure corresponding to the maximum load capability as prescribed in the standard. The "maximum load capability" is the maximum mass permitted to be loaded onto the tire in the standard.

(2) Preferably, the heavy-duty pneumatic tire according to the disclosure has shoulder blocks defined by a tread ground contact edge, a circumferential main groove nearest the tread ground contact edge, and a plurality of lug grooves each open to the tread ground contact edge and the circumferential main groove nearest the tread ground contact edge, wherein at least one of the shoulder blocks has an auxiliary lateral groove that extends from the block auxiliary groove in the small block and is shallower than the circumferential main grooves.

With such a structure, the temperature increase of the tread portion can be further suppressed.

Here, "an auxiliary lateral groove that extends from the block auxiliary groove" means the auxiliary lateral groove is formed so that the straight or curved line drawn continuously to represent the center of the opening of the auxiliary lateral groove to the tread surface in the groove extending direction is continuous with that of the block auxiliary groove.

(3) Preferably, in the heavy-duty pneumatic tire according to the disclosure, the block auxiliary groove is formed in both of the small blocks symmetrically with respect to a center point of a tire circumferential length of the block partitioning groove.

With such a structure, the temperature of the tread portion can be reduced while suppressing pattern vibration caused by grooves.

Moreover, to keep appropriate block rigidity and maintain favorable wear resistance in the tread surface while reliably suppressing the tire circumferential shearing strain and heat generation in the tread portion, the heavy-duty pneumatic tire according to the disclosure preferably has any of the following structures:

(4) A ratio of a depth of the block partitioning groove to a depth of the circumferential main grooves is 0.5 or more and 0.9 or less.

(5) A ratio of a depth of the block auxiliary groove to a depth of the circumferential main grooves is 0.5 or more and 0.7 or less.

(6) A ratio of a groove width of the block partitioning groove to a tire widthwise length of the block land portion is 0.1 or more and 0.2 or less.

(7) A ratio of a groove width of the block auxiliary groove to a tire circumferential length of the block land portion is 0.05 or more and 0.14 or less.

(8) The block partitioning groove extends at an angle of 15° or less with the tire circumferential direction.

The width of each type of groove is determined by measuring the distance between one opening edge of the groove and the other opening edge of the groove in the tread surface, in a cross section perpendicular to the groove extending direction. In the case where the groove width varies along the groove extending direction, the average groove width is set as the groove width of the groove.

Advantageous Effect

It is thus possible to provide a heavy-duty pneumatic tire that can suppress the tire circumferential shearing strain and heat generation in the tread portion to prevent the separation failure between the tread rubber and the belt more effectively.

BRIEF DESCRIPTION OF THE DRAWINGS

In the accompanying drawings.

DETAILED DESCRIPTION

The following describes embodiments of a heavy-duty pneumatic tire (hereafter also simply referred to as "tire") according to the disclosure with reference to drawings.

Figure 1:
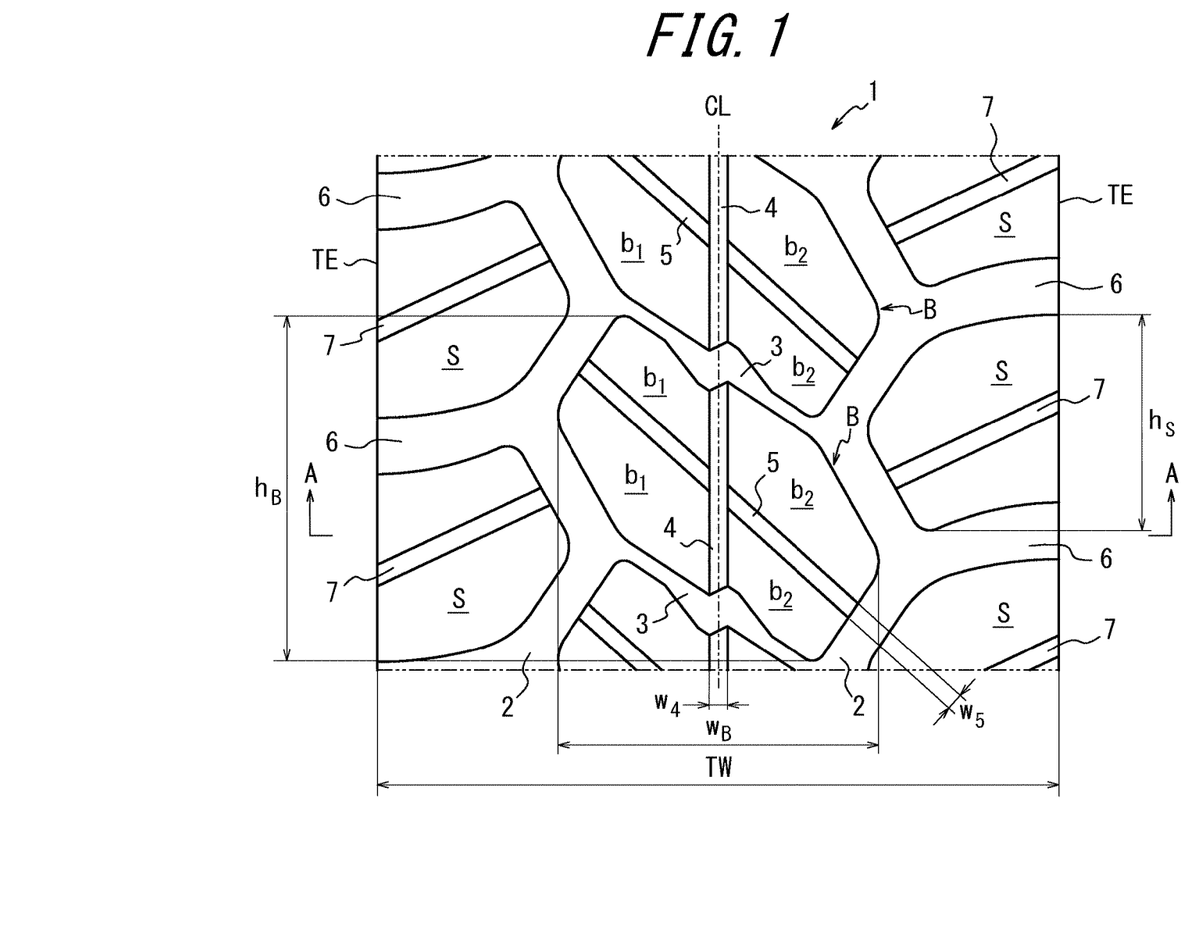
FIG. 1 is a partial development view of a tread pattern in one of the disclosed embodiments.

FIG. 1 illustrates a tread pattern in a tire according to one of the disclosed embodiments.

Although not illustrated, the tire includes: a carcass made up of one or more plies extending from a pair of bead portions through sidewall portions to a tread portion; a belt located on the tire radial outer side of the carcass; and a tread rubber located on the tire radial outer side of the belt and having a tread surface 1 on its outer circumferential side, as with typical tires.

In the tread surface 1 of the tire illustrated in FIG. 1, blocks B are defined by a plurality of (two in the illustrated example) circumferential main grooves 2 each continuously extending in the tread circumferential direction and a plurality of transverse grooves 3 each communicating between the circumferential main grooves 2 adjacent in the tire width direction. The circumferential main grooves 2 preferably extend in a zigzag shape of bending to the right and left in the drawing at a plurality of positions in the tread circumferential direction, as illustrated in the drawing. The circumferential main grooves are not limited to extending in a zigzag shape as in FIG. 1, and may extend in a serrated shape, wavy shape, crank shape, or the like, or extend linearly along the tread circumferential direction. On the tire widthwise outer side of each of the two circumferential main grooves 2, shoulder blocks S are defined by the tread ground contact edge TE, the circumferential main groove 2, and a plurality of lug grooves 6 each open to the ground contact edge TE and the circumferential main groove 2.

In this embodiment, at least one of the blocks B has a block partitioning groove 4 that is open to each of the transverse grooves 3 defining the block B and is shallower than the circumferential main grooves 2, to divide the block B into a plurality of (two in the illustrated example) small blocks $b_1$ and $b_2$. In addition, at least one of the small blocks $b_1$ and $b_2$ (both small blocks $b_1$ and $b_2$ in the illustrated example) has a block auxiliary groove 5 that is open to the block partitioning groove 4 at one end and open to the corresponding circumferential main groove 2 or transverse groove 3 (the circumferential main groove 2 in the illustrated example) at the other end and is shallower than the circumferential main grooves 2.

When the tire rolls under load, if the block B is squashed, tire circumferential shearing strain occurs on the belt on the inner side of the tread due to the movement of pushing the tread out in the tire circumferential direction. However, by forming the block partitioning groove 4 in the block B, the force of pushing the tread out in the tire circumferential direction is distributed in the tire width direction, as a result of which the amount of pushing the tread out in the tire circumferential direction is reduced. The tire circumferential shearing strain on the belt can be suppressed in this way.

When the tire circumferential shearing strain in the tread portion is greater or the tread temperature is higher, the separation between the tread rubber and the belt located on the tire radial inner side of the tread rubber is more likely to develop in the tire circumferential direction from an initial cut. By suppressing the tire circumferential shearing strain in the tread portion, however, the heat generation in the tread portion is reduced to avoid an increase in tread temperature. This has a synergistic effect of preventing the separation failure between the tread rubber and the belt.

The heat generation of the tread portion tends to increase especially near the tire equatorial plane CL having high ground contact pressure. By forming the block partitioning groove 4 in the block B, heat can be released to the outside to effectively avoid an increase in tread temperature. In particular, by forming not only the block partitioning groove 4 but also the block auxiliary groove 5 which is open to the block partitioning groove 4 at one end and open to the circumferential main groove 2 or the transverse groove 3 at the other end as mentioned above, air can be let into the block partitioning groove 4. This further enhances the effect of suppressing an increase in tread temperature.

The ratio $d_4/d_2$ of the depth $d_4$ of the block partitioning groove 4 formed in the block B to the depth $d_2$ of the circumferential main grooves 2 is preferably 0.5 or more and 0.9 or less. If the ratio is 0.5 or more, the pushing of the tread out in the tire circumferential direction can be reduced favorably to suppress the tire circumferential shearing strain, and also the temperature increase of the tread portion can be suppressed favorably. If the ratio is 0.9 or less, the rigidity of the block B can be maintained favorably to prevent wear resistance degradation.

The ratio $d_5/d_2$ of the depth $d_5$ of the block auxiliary groove 5 to the depth $d_2$ of the circumferential main grooves is preferably 0.5 or more and 0.7 or less. If the ratio is 0.5 or more, the tread surface area can be increased sufficiently to facilitate the heat dissipation of the tread portion, thus suppressing the temperature increase of the tread portion more favorably. If the ratio is 0.7 or less, the rigidity of the block B can be maintained favorably to prevent wear resistance degradation.

The ratio $w_4/w_B$ of the groove width $w_4$ of the block partitioning groove 4 to the tire widthwise length $w_B$ of the block land portion B is preferably 0.1 or more and 0.2 or less. If the ratio is 0.1 or more, the small blocks $b_1$ and $b_2$ separated by the block partitioning groove 4 spread in the tire width direction without coming into contact with each other when the tire rolls under load, so that the tire circumferential shearing strain can be suppressed more favorably. If the ratio is 0.2 or less, the negative ratio of the tread is kept from increasing excessively, and so the rigidity of the block B can be maintained favorably to prevent wear resistance degradation.

The ratio $w_5/h_B$ of the groove width $w_5$ of the block auxiliary groove 5 to the tire circumferential length $h_B$ of the block land portion B is preferably 0.05 or more and 0.14 or less. If the ratio is 0.05 or more, the block portions separated by the block auxiliary groove 5 are kept from coming into contact with each other and causing a decrease in heat dissipation effect when the tire rolls under load. If the ratio is 0.14 or less, the negative ratio of the tread is kept from increasing excessively, and so the rigidity of the block B can be maintained favorably to prevent wear resistance degradation.

The angle $\theta_1$ of the block partitioning groove 4 with the tire circumferential direction is preferably 15° or less. If the angle $\theta_1$ is 15° or less, the amount of pushing the tread out in the tire width direction is secured to more reliably reduce the amount of pushing the tread out in the tire circumferential direction, so that the tire circumferential shearing rigidity in the tread portion can be reduced favorably. In the example in FIG. 1, $\theta_1=0°$.

The angle of the block auxiliary groove 5 with the tire circumferential direction is determined according to the shape of the block land portion B and its angle with the tire circumferential direction. The block auxiliary groove 5 is preferably formed to extend as long as possible. Such a block auxiliary groove 5 is expected to produce the maximum heat dissipation effect.

In the embodiment illustrated in FIG. 1, the block partitioning groove 4 and the block auxiliary groove 5 are arranged in a tire widthwise area that centers on the tire equatorial plane CL and whose width in the tire width direction is 40% of the tread width TW.

Thus, the block partitioning groove 4 and the block auxiliary groove 5 are preferably arranged in a tire widthwise area that centers on the tire equatorial plane CL and whose width in the tire width direction is less than or equal to 50% of the tread width TW. This structure suppresses the tire circumferential shearing strain in the tread portion and reduces the heat generation in the vicinity of the tire equatorial plane where the tread temperature tends to increase particularly, thus enhancing the effect of preventing the separation failure between the tread rubber and the belt.

In the embodiment illustrated in FIG. 1, at least one of the shoulder blocks S defined by the plurality of lug grooves 6 has at least one (one in the illustrated example) auxiliary lateral groove 7 that is open to the tread ground contact edge TE and the circumferential main groove 2 and is shallower than the circumferential main grooves 2. Such an auxiliary lateral groove 7 can reduce the tread temperature of the shoulder block S.

The ratio $d_7/d_2$ of the depth $d_7$ of the auxiliary lateral groove 7 to the depth $d_2$ of the circumferential main grooves 2 is preferably 0.5 or more and 0.7 or less. If the ratio is 0.5 or more, the tread surface area can be increased sufficiently to facilitate the heat dissipation of the tread portion, thus suppressing the increase of the tread temperature. If the ratio is 0.7 or less, the rigidity of the shoulder block S can be maintained favorably to prevent wear resistance degradation.

Figure 2:
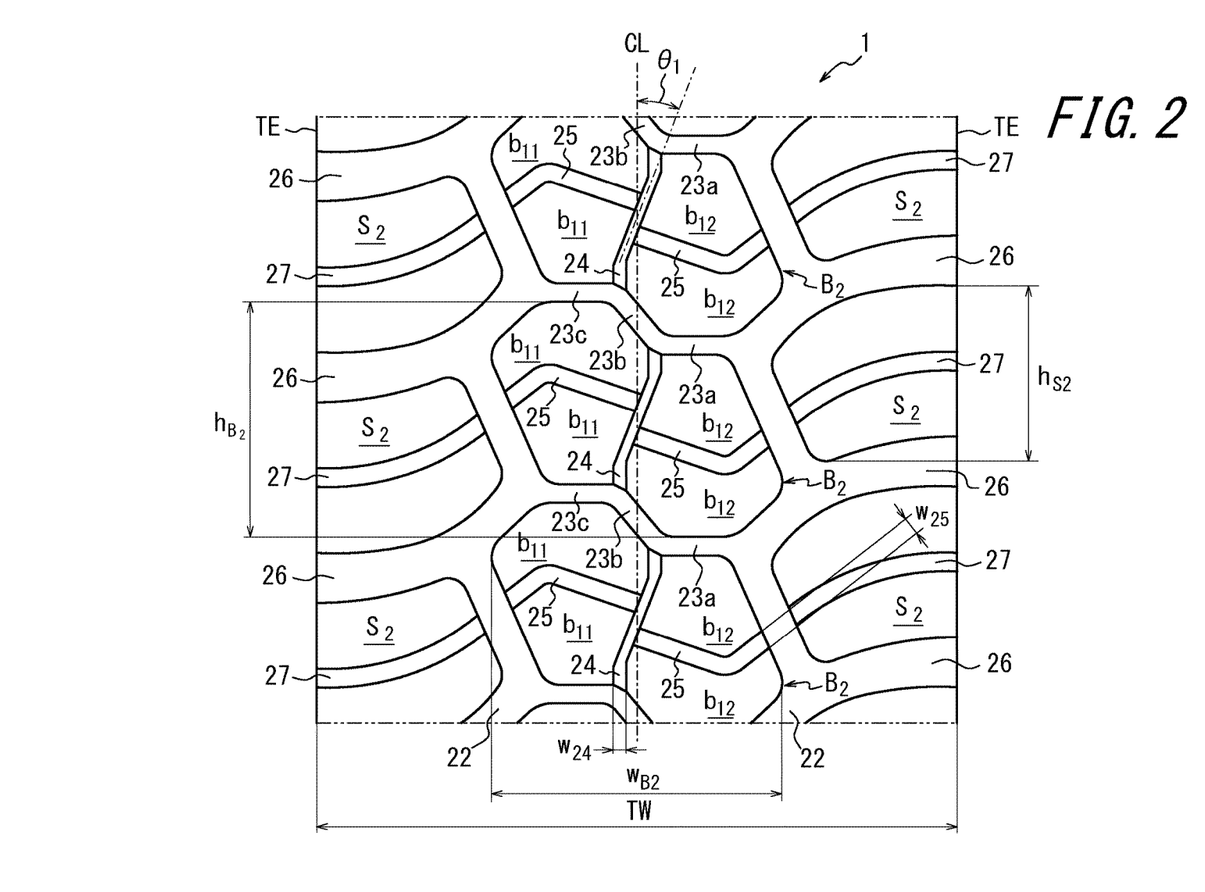
FIG. 2 is a partial development view of a tread pattern in another one of the disclosed embodiments.

The following describes another one of the disclosed embodiments illustrated in FIG. 2. In the tread surface 1, blocks $B_2$ are defined by a plurality of (two in the illustrated example) circumferential main grooves 22 each continuously extending in the tread circumferential direction and a plurality of transverse grooves 23 each communicating between the circumferential main grooves 22 adjacent in the tire width direction. The circumferential main grooves 22 preferably extend in a zigzag shape of bending to the right and left in the drawing at a plurality of positions in the tread circumferential direction, as illustrated in the drawing. The circumferential main grooves 22 are not limited to extending in a zigzag shape as in FIG. 2, and may extend in a serrated shape, wavy shape, crank shape, or the like, or extend linearly along the tread circumferential direction, as in the embodiment illustrated in FIG. 1.

In FIG. 2, each transverse groove 23 is made up of widthwise extending portions 23a and 23c extending from the bending locations of the respective adjacent circumferential main grooves 22 substantially in parallel with the tread width direction, and an inclined portion 23b extending while being inclined with respect to the tread width direction so as to connect the widthwise extending portions 23a and 23c to each other near the tire equatorial plane CL.

In this embodiment, at least one of the blocks $B_2$ defined by such transverse grooves 23 and circumferential main grooves 22 and having an irregular polygonal shape as illustrated has: a block partitioning groove 24 that extends while being inclined with respect to the tread circumferential direction with small bends halfway, to divide the block $B_2$ into a plurality of (two in the illustrated example) small blocks $b_{11}$ and $b_{12}$; and a block auxiliary groove 25 that has one bend in the tire circumferential direction and is open to the block partitioning groove 24 at one end and open to the corresponding circumferential main groove 22 or transverse groove 23 (the circumferential main groove 22 in the illustrated example) at the other end. The block partitioning groove 24 and the block auxiliary groove 25 are both shallower than the circumferential main grooves 22.

In the embodiment illustrated in FIG. 2, on the tire widthwise outer side of each of the two circumferential main grooves 22, shoulder blocks $S_2$ are defined by the tread ground contact edge TE, the circumferential main groove 22, and a plurality of lug grooves 26 each open to the ground contact edge TE and the circumferential main groove 22, as in the embodiment illustrated in FIG. 1.

Here, at least one of the shoulder blocks $S_2$ has at least one (one in the illustrated example) auxiliary lateral groove 27 that is open to the tread ground contact edge TE and the circumferential main groove 22 and extends from the block auxiliary groove 25. In more detail, the auxiliary lateral groove 27 is formed so that the curved line drawn continuously to represent the center of the opening of the auxiliary lateral groove 27 to the tread surface in the extending direction of the auxiliary lateral groove 27 is continuous with that of the block auxiliary groove 25. With this structure, the block auxiliary groove 25 of the block $B_2$ and the auxiliary lateral groove 27 of the shoulder block $S_2$ are continuous without being interrupted. Hence, outside air entering from the auxiliary lateral groove 27 flows into the circumferential partitioning narrow groove 24 of the block $B_2$ without escaping, so that the increase of the tread temperature near the tire equatorial plane CL can be suppressed effectively. Since the tread temperature hardly increases, the development of the separation between the tread rubber and the belt can be prevented.

In this embodiment, the block auxiliary groove 25 is formed in both small blocks $b_{11}$ and $b_{12}$ symmetrically with respect to the center point of the tire circumferential length of the block partitioning groove 24.

In such a case, outside air flowing in the tire width direction can be finely guided in the tire circumferential direction. This enhances the heat dissipation effect of the tread portion, and suppresses the increase of the tread temperature more effectively.

The ratio $d_{27}/d_{22}$ of the depth $d_{27}$ of the auxiliary lateral groove 27 formed in the shoulder land portion $S_2$ to the depth $d_{22}$ of the circumferential main grooves 22 is preferably 0.5 or more and 0.7 or less. If the ratio is 0.5 or more, the tread surface area can be increased sufficiently to reliably reduce the heat generation of the tread portion. If the ratio is 0.7 or less, the rigidity of the shoulder block $S_2$ can be maintained favorably to prevent wear resistance degradation.

The ratio $d_7/d_2$ of the depth $d_7$ of the auxiliary lateral groove 7 to the depth $d_2$ of the circumferential main grooves 2 in FIG. 1 is preferably in the same range.

The ratio of the width $w_{27}$ of the auxiliary lateral groove 27 formed in the shoulder block $S_2$ to the tire circumferential length $h_{S2}$ of the shoulder block $S_2$ is preferably 0.05 or more and 0.11 or less. If the ratio is 0.05 or more, the block portions separated by the auxiliary lateral groove 27 are kept from coming into contact with each other and causing a decrease in heat dissipation effect when the tire rolls under load. If the ratio is 0.11 or less, the negative ratio of the tread is kept from increasing excessively, and so the rigidity of the shoulder block $S_2$ can be maintained favorably to prevent wear resistance degradation.

The ratio $w_7/w_2$ of the width $w_7$ of the auxiliary lateral groove 7 to the width $w_2$ of the circumferential main groove 2 in FIG. 1 is preferably in the same range.

In the embodiment illustrated in FIG. 2, the ratio $d_{24}/d_{22}$ of the depth $d_{24}$ of the block partitioning groove 24 to the depth $d_{22}$ of the circumferential main grooves 22, the ratio $d_{25}/d_{22}$ of the depth $d_{25}$ of the block auxiliary groove 25 to the depth $d_{22}$ of the circumferential main grooves 22, the ratio $w_{24}/w_{B2}$ of the groove width $w_{24}$ of the block partitioning groove 24 to the tire widthwise length $w_{B2}$ of the block land portion $B_2$, the ratio $w_{25}/h_{B2}$ of the groove width $w_{25}$ of the block auxiliary groove 25 to the tire circumferential length $h_{B2}$ of the block land portion $B_2$, and the angle $\theta_1$ of the block partitioning groove 24 with the tire circumferential direction are preferably in the same ranges as in the embodiment illustrated in FIG. 1.

With such a structure, appropriate block rigidity can be kept and favorable wear resistance in the tread surface can be maintained while reliably suppressing the tire circumferential shearing strain and heat generation in the tread portion.

Figure 4:
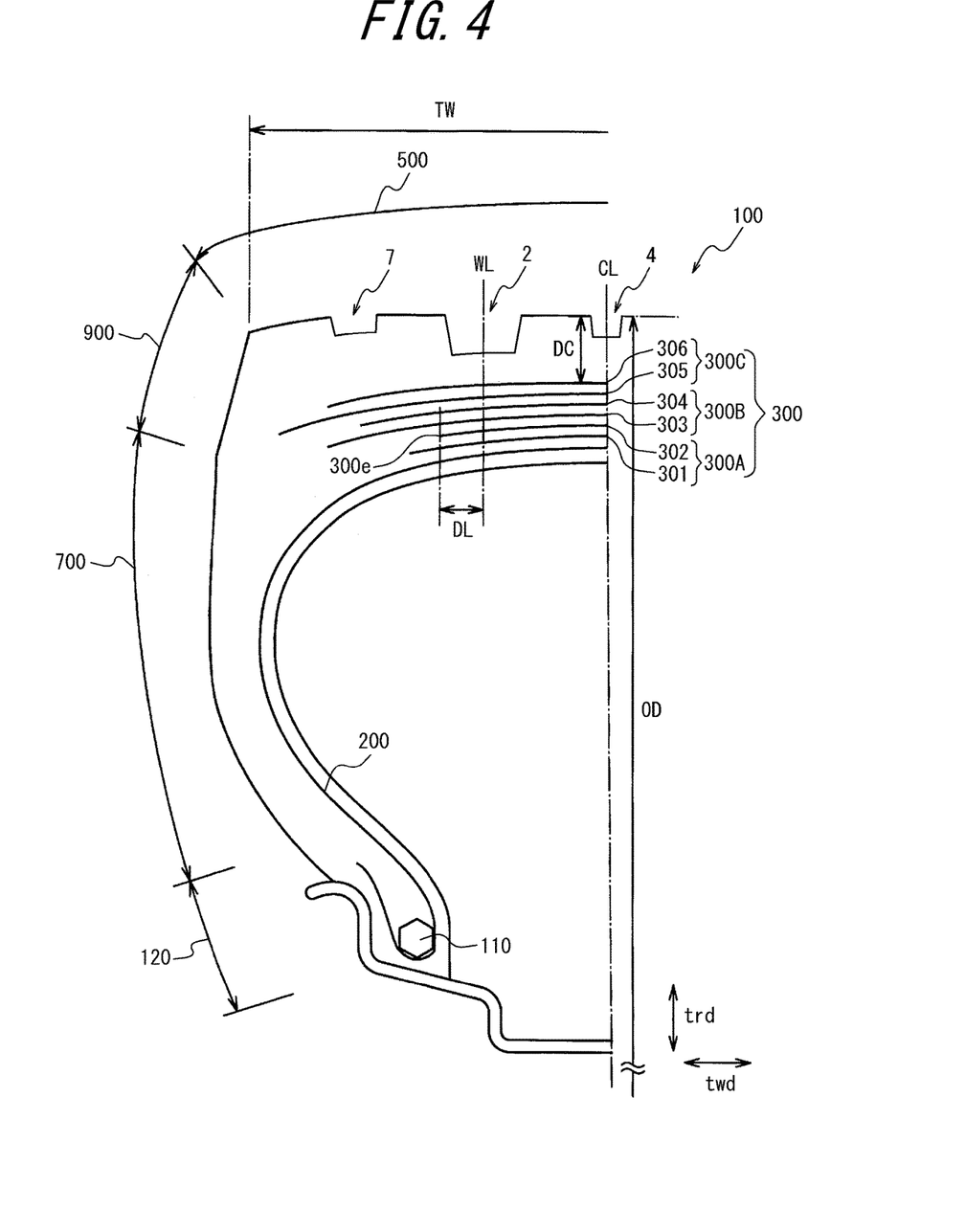
FIG. 4 is a sectional view of the tire in FIG. 1 taken along line A-A.

FIG. 4 is a sectional view of the tire structure of the tire having the tread pattern illustrated in FIG. 1 according to one of the disclosed embodiments, i.e. a heavy-duty tire for a construction vehicle, taken along the tire width direction. As illustrated in FIG. 4, a tire 100 includes a tread portion 500 with a thicker rubber gauge (greater rubber thickness) than a pneumatic tire attached to a passenger vehicle or the like. The tire having the tread pattern illustrated in FIG. 2 according to another one of the disclosed embodiments also has the same tire structure.

In detail, the tire 100 satisfies DC/OD ≥0.015, where OD is the tire outer diameter and DC is the rubber gauge of the tread portion 500 in the position of the tire equator CL.

The tire outer diameter OD (in mm) is the diameter of the tire 100 in the part where the outer diameter of the tire 100 is largest (typically, the tread portion 500 near the tire equator CL). The rubber gauge DC (in mm) is the rubber thickness of the tread portion 500 in the position of the tire equator CL. The rubber gauge DC does not include the thickness of a belt 300. In the case where a circumferential groove is formed in the position including the tire equator CL, the rubber gauge DC is the rubber thickness of the tread portion 500 in the position adjacent to the circumferential groove.

The tire 100 includes a pair of bead cores 110, a carcass 200, and the belt 300 made up of a plurality of belt layers, as illustrated in FIG. 4.

Each bead core 110 is provided in a bead portion 120. The bead core 110 is made of bead wires (not illustrated).

The carcass 200 is the framework of the tire 100. The carcass 200 extends from the tread portion 500 to the bead portion 120 through a buttress portion 900 and a sidewall portion 700.

The carcass 200 toroidally extends between the pair of bead cores 110. In this embodiment, the carcass 200 envelops each bead core 110. The carcass 200 is in contact with each bead core 110. Both ends of the carcass 200 in the tread width direction twd are supported by the pair of bead portions 120.

The carcass 200 has carcass cords extending in a predetermined direction in a tread plan view. In this embodiment, the carcass cords extend along the tread width direction twd. The carcass cords are steel wires as an example.

The belt 300 is placed in the tread portion 500. The belt 300 is located outside the carcass 200 in the tire radial direction trd. The belt 300 extends in the tire circumferential direction. The belt 300 has belt cords extending while being inclined with respect to the predetermined direction in which the carcass cords extend. The belt cords are steel cords as an example.

The belt 300 made up of the plurality of belt layers includes a first belt layer 301, a second belt layer 302, a third belt layer 303, a fourth belt layer 304, a fifth belt layer 305, and a sixth belt layer 306.

The first belt layer 301 is located outside the carcass 200 in the tire radial direction trd. The first belt layer 301 is located innermost in the belt 300 made up of the plurality of belt layers, in the tire radial direction trd. The second belt layer 302 is located outside the first belt layer 301 in the tire radial direction trd. The third belt layer 303 is located outside the second belt layer 302 in the tire radial direction trd. The fourth belt layer 304 is located outside the third belt layer 303 in the tire radial direction trd. The fifth belt layer 305 is located outside the fourth belt layer 304 in the tire radial direction trd. The sixth belt layer 306 is located outside the fifth belt layer 305 in the tire radial direction trd. The sixth belt layer 306 is located outermost in the belt 300 made up of the plurality of belt layers, in the tire radial direction trd. The first belt layer 301, the second belt layer 302, the third belt layer 303, the fourth belt layer 304, the fifth belt layer 305, and the sixth belt layer 306 are arranged in this order outward in the tire radial direction trd.

In this embodiment, the width of the first belt layer 301 and second belt layer 302 in the tread width direction twd is 25% or more and 70% or less of the tread width TW. The width of the third belt layer 303 and fourth belt layer 304 in the tread width direction twd is 55% or more and 90% or less of the tread width TW. The width of the fifth belt layer 305 and sixth belt layer 306 in the tread width direction twd is 60% or more and 110% or less of the tread width TW.

In this embodiment, the width of the fifth belt layer 305 is greater than the width of the third belt layer 303, the width of the third belt layer 303 is greater than or equal to the width of the sixth belt layer 306, the width of the sixth belt layer 306 is greater than the width of the fourth belt layer 304, the width of the fourth belt layer 304 is greater than the width of the first belt layer 301, and the width of the first belt layer 301 is greater than the width of the second belt layer 302 in the tread width direction twd. In the belt 300 made up of the plurality of belt layers, the width of the fifth belt layer 305 is largest and the width of the second belt layer 302 is smallest in the tread width direction twd. The belt 300 made up of the plurality of belt layers thus includes a shortest belt layer (i.e. the second belt layer 302) that is shortest in the tread width direction twd.

The second belt layer 302 which is the shortest belt layer has a belt end 300e which is an end portion in the tread width direction twd.

In this embodiment, in a tread plan view, the inclination angle of the belt cords of the first belt layer 301 and second belt layer 302 with respect to the carcass cords is 70° or more and 85° or less. The inclination angle of the belt cords of the third belt layer 303 and fourth belt layer 304 with respect to the carcass cords is 50° or more and 75° or less.

The inclination angle of the belt cords of the fifth belt layer 305 and sixth belt layer 306 with respect to the carcass cords is 50° or more and 70° or less.

The plurality of belt layers 300 include an inner crossing belt group 300A, an intermediate crossing belt group 300B, and an outer crossing belt group 300C.

The inner crossing belt group 300A is a set of belt layers 300, and is located outside the carcass 200 in the tire radial direction trd. The inner crossing belt group 300A is made up of the first belt layer 301 and the second belt layer 302. The intermediate crossing belt group 300B is a set of belt layers 300, and is located outside the inner crossing belt group 300A in the tire radial direction trd. The intermediate crossing belt group 300B is made up of the third belt layer 303 and the fourth belt layer 304. The outer crossing belt group 300C is a set of belt layers 300, and is located outside the intermediate crossing belt group 300B in the tire radial direction trd. The outer crossing belt group 300C is made up of the fifth belt layer 305 and the sixth belt layer 306.

The width of the inner crossing belt group 300A is 25% or more and 70% or less of the tread width TW in the tread width direction twd. The width of the intermediate crossing belt group 300B is 55% or more and 90% or less of the tread width TW in the tread width direction twd. The width of the outer crossing belt group 300C is 60% or more and 110% or less of the tread width TW in the tread width direction twd.

The inclination angle of the belt cords of the inner crossing belt group 300A with respect to the carcass cords is 70° or more and 85° or less in the tread plan view. The inclination angle of the belt cords of the intermediate crossing belt group 300B with respect to the carcass cords is 50° or more and 75° or less in the tread plan view. The inclination angle of the belt cords of the outer crossing belt group 300C with respect to the carcass cords is 50° or more and 70° or less in the tread plan view.

The inclination angle of the belt cords with respect to the carcass cords is largest in the inner crossing belt group 300A, in the tread plan view. The inclination angle of the belt cords of the intermediate crossing belt group 300B with respect to the carcass cords is larger than or equal to the inclination angle of the belt cords of the outer crossing belt group 300C with respect to the carcass cords.

The circumferential groove 2 is formed so that the length DL along the tread width direction twd from the belt end 300e to the groove center line WL passing through the widthwise center of the circumferential groove 2 in the tread plan view of the tire is 200 mm or less.

EXAMPLES

The following describes examples.

Example tires and comparative example tires (all tires have a tire size of 46/90R57) were experimentally produced according to the specifications shown in Table 1, and the reduction levels of the tread temperature and circumferential shearing strain on the belt (measured in the position of the tire equatorial plane) were checked by a heat generation test and a road surface observation test on the tread portion using actual tires. Further, each of these tires was attached to a dump truck, and the tire life from when the tread portion received a cut to when the tread rubber and the belt separated from each other and the tire became a waste article was compared. In the table, "groove arrangement area" indicates the area centering on the tire equatorial plane CL where the block transverse narrow groove 4 and the block auxiliary groove 5 are arranged, as a ratio to the tread width TW.

TABLE 1

Figure 3A:
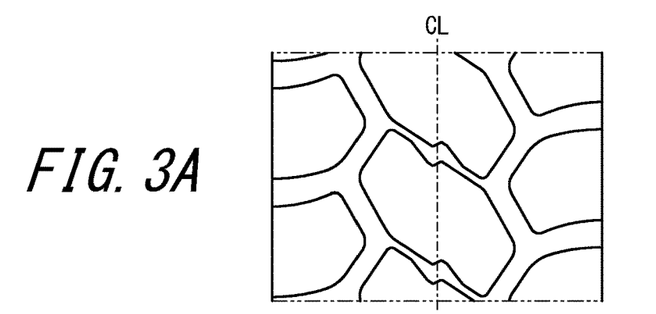
FIG. 3A is a partial development view of a tread pattern in a tire of Comparative Example 1.
Figure 3B:
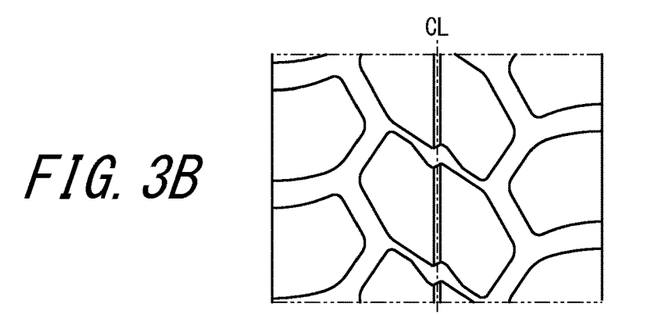
FIG. 3B is a partial development view of a tread pattern in a tire of Comparative Example 2.
Figure 3C:
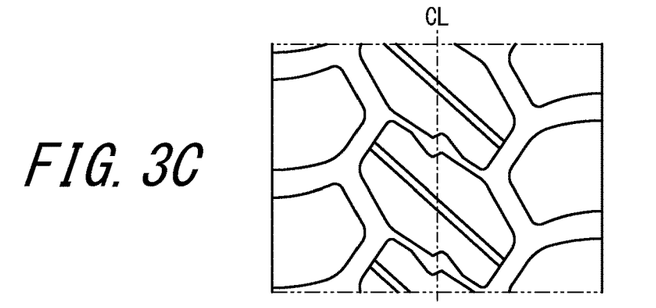
FIG. 3C is a partial development view of a tread pattern in a tire of Comparative Example 3.
Figure 3D:
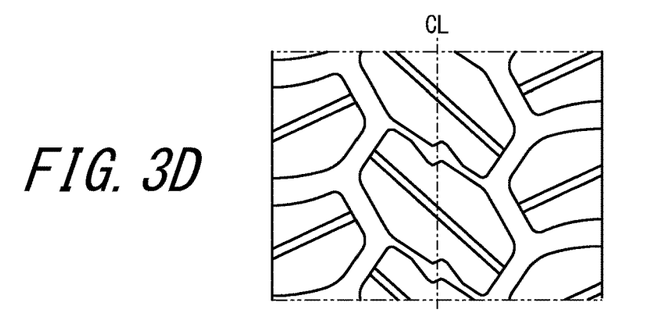
FIG. 3D is a partial development view of a tread pattern in a tire of Comparative Example 4.

|  |  | Comp. Ex. 1 | Comp. Ex. 2 | Comp. Ex. 3 | Comp. Ex. 4 | Ex. 1 | Ex. 2 | Ex. 3 | Ex. 4 | Ex. 5 | Ex. 6 |
|---|---|---|---|---|---|---|---|---|---|---|---|
| Pattern |  | FIG. 3A | FIG. 3B | FIG. 3C | FIG. 3D | FIG. 1 | FIG. 1 | FIG. 1 | FIG. 1 | FIG. 1 | FIG. 1 |
| Groove arrangement area (%) |  | — | 10 | 40 | 40 | 40 | 40 | 40 | 40 | 40 | 40 |
| Block transverse narrow groove | $d_4/d_2$ | — | 0.8 | — | — | 0.5 | 0.8 | 0.9 | 1.0 | 0.5 | 0.5 |
|  | $w_4/w_B$ | — | 0.20 | — | — | 0.10 | 0.10 | 0.10 | 0.10 | 0.08 | 0.10 |
|  | $\theta_1$ (°) | — | 0 | — | — | 0 | 15 | 15 | 15 | 15 | 15 |
| Block auxiliary groove | $d_5/d_2$ | — | — | 0.6 | 0.6 | 0.6 | 0.6 | 0.6 | 0.6 | 0.6 | 0.6 |
|  | $w_5/h_B$ | — | — | 0.10 | 0.10 | 0.10 | 0.10 | 0.10 | 0.10 | 0.10 | 0.10 |
| Auxiliary lateral groove | $d_7/d_2$ | — | — | — | 0.6 | 0.6 | 0.6 | 0.6 | 0.6 | 0.6 | 0.6 |
|  | $w_7/hs$ | — | — | — | 0.10 | 0.10 | 0.10 | 0.10 | 0.10 | 0.10 | 0.10 |
| Tread portion temperature (° C.) |  | 80 | 79 | 78 | 77 | 76 | 75.5 | 75 | 75 | 76.5 | 76 |
| Circumferential shearing strain |  | 100 | 92 | 100 | 100 | 98 | 92 | 90 | 88 | 98 | 98 |
| Cut/separation life |  | 100 | 113 | 108 | 112 | 119 | 127 | 130 | 134 | 117 | 119 |
| Wear resistance |  | 100 | 100 | 100 | 100 | 100 | 100 | 97 | 94 | 100 | 100 |

|  |  | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|
| Pattern |  | FIG. 1 | FIG. 1 | FIG. 1 | FIG. 1 | FIG. 1 | FIG. 1 | FIG. 1 | FIG. 1 | FIG. 2 | FIG. 2 |
| Groove arrangement area (%) |  | 40 | 40 | 40 | 40 | 40 | 40 | 40 | 40 | 40 | 40 |
| Block transverse narrow groove | $d_4/d_2$ | 0.5 | 0.5 | 0.5 | 0.5 | 0.5 | 0.5 | 0.5 | 0.5 | 0.8 | 0.8 |
|  | $w_4/w_B$ | 0.20 | 0.25 | 0.10 | 0.10 | 0.10 | 0.10 | 0.10 | 0.10 | 0.10 | 0.20 |
|  | $\theta_1$ (°) | 15 | 15 | 15 | 15 | 15 | 15 | 15 | 20 | 15 | 15 |
| Block auxiliary groove | $d_5/d_2$ | 0.6 | 0.6 | 0.3 | 0.7 | 1.0 | 0.6 | 0.6 | 0.6 | 0.6 | 0.6 |
|  | $w_5/h_B$ | 0.10 | 0.10 | 0.10 | 0.10 | 0.10 | 0.03 | 0.15 | 0.10 | 0.10 | 0.10 |
| Auxiliary lateral groove | $d_7/d_2$ | 0.6 | 0.6 | 0.6 | 0.6 | 0.6 | 0.6 | 0.6 | 0.6 | 0.6 | 0.6 |
|  | $w_7/hs$ | 0.10 | 0.10 | 0.10 | 0.10 | 0.10 | 0.10 | 0.10 | 0.10 | 0.10 | 0.10 |
| Tread portion temperature (° C.) |  | 76 | 76 | 77 | 76 | 75 | 77 | 76 | 76 | 75.5 | 75.5 |
| Circumferential shearing strain |  | 98 | 98 | 98 | 98 | 98 | 98 | 98 | 97.5 | 92 | 92 |
| Cut/separation life |  | 119 | 119 | 115 | 119 | 123 | 115 | 119 | 119 | 127 | 127 |
| Wear resistance |  | 100 | 98 | 100 | 100 | 91 | 100 | 97 | 100 | 100 | 100 |

In Table 1, the circumferential shearing strain, the tire life, and the wear resistance are each expressed as an index with the tire of Comparative Example 1 being set as 100. The circumferential shearing strain is smaller when the value is smaller, and each of the tire life and the wear resistance is better when the value is larger.

REFERENCE SIGNS LIST 1 tread surface
2, 22 circumferential main groove
3, 23 transverse groove
4, 24 block partitioning groove
5, 25 block auxiliary groove
6, 26 lug groove
7, 27 auxiliary lateral groove
B, $B_2$ block
CL tire equatorial plane
S, $S_2$ shoulder block
TE tread ground contact edge
TW tread width

The invention claimed is:

1. A heavy-duty pneumatic tire having, in a tread surface, blocks defined by a plurality of circumferential main grooves each continuously extending in a tire circumferential direction and a plurality of transverse grooves each communicating between circumferential main grooves adjacent in a tire width direction,
  wherein in a tire widthwise area that centers on a tire equator and whose width in the tire width direction is 50% of a tread width:
  at least one of the blocks has a block partitioning groove that is open to each of transverse grooves defining the block and is shallower than the circumferential main grooves, to divide the block into a plurality of small blocks;
  at least one of the small blocks has a block auxiliary groove that is open to the block partitioning groove at one end and open to a corresponding circumferential main groove or transverse groove at another end and is shallower than the circumferential main grooves; and
  the pneumatic tire comprises an auxiliary lateral groove, wherein a ratio of the width of the auxiliary lateral groove to a width of the circumferential main groove is with a range of 0.05 or more to 0.11 or less,
  wherein a ratio of a rubber gauge of the tread of the pneumatic tire in an area of a tire equator line DC, to a tire outer diameter OD, satisfies DC/OD ≥0.015.
  wherein the pneumatic tire comprises first, second, third, fourth, fifth. and sixth belt layers, and
  a width of the first belt layer and a width of the second belt layer in a tread width direction TWD are 25% or more and 70% or less of a tread width TW, and
  a width of the third belt layer and a width of the fourth belt layer in the tread width direction TWD are 55% or more and 90% or less of the tread width TW, and
  the width of the fifth belt layer and the sixth belt layer in the tread width direction TWD are 60% or more and 110% or less of the tread width TW, and
  a width of the block partitioning groove is smaller than a width of the block auxiliary groove.

2. The heavy-duty pneumatic tire according to claim 1, having shoulder blocks defined by a tread ground contact edge, a circumferential main groove nearest the tread ground contact edge, and a plurality of lug grooves each open to the tread ground contact edge and the circumferential main groove nearest the tread ground contact edge,
  wherein at least one of the shoulder blocks has an auxiliary lateral groove that extends from the block auxiliary groove in the small block and is shallower than the circumferential main grooves.

3. The heavy-duty pneumatic tire according to claim 1, wherein the block auxiliary groove is formed in both of the small blocks symmetrically with respect to a center point of a tire circumferential length of the block partitioning groove.

4. The heavy-duty pneumatic tire according to claim 1, wherein a ratio of a depth of the block partitioning groove to a depth of the circumferential main grooves is 0.5 or more and 0.9 or less.

5. The heavy-duty pneumatic tire according to claim 1, wherein a ratio of a depth of the block auxiliary groove to a depth of the circumferential main grooves is 0.5 or more and 0.7 or less.

6. The heavy-duty pneumatic tire according to claim 1, wherein a ratio of a groove width of the block partitioning groove to a tire widthwise length of the block is 0.1 or more and 0.2 or less.

7. The heavy-duty pneumatic tire according to claim 1, wherein a ratio of a groove width of the block auxiliary groove to a tire circumferential length of the block is 0.05 or more and 0.14 or less.

8. The heavy-duty pneumatic tire according to claim 1, wherein the block partitioning groove extends at an angle of 15° or less with respect to the tire circumferential direction.

9. The heavy-duty pneumatic tire according to claim 1, wherein a number of block rows is three.

10. The heavy-duty pneumatic tire according to claim 1, wherein the block auxiliary groove opens to the transverse groove.

11. The heavy-duty pneumatic tire according to claim 1, wherein the block partitioning groove extends inclined with respect to a tire circumferential direction with bends to divide the block that includes the block partitioning groove into a plurality of small blocks, and
wherein the block auxiliary groove includes one bend in the tire circumferential direction.

12. The heavy-duty pneumatic tire according to claim 1, wherein a depth of the block partitioning groove and a depth of the block auxiliary groove are less than a depth of the circumferential main groove.

13. The heavy-duty pneumatic tire according to claim 1, further comprising an auxiliary lateral groove connected to the block auxiliary groove,
wherein the auxiliary lateral groove is formed so that a curved line drawn continuously to represent the center of an opening of the auxiliary lateral groove to the tread surface in an extending direction of the auxiliary lateral groove is continuous with a center of the opening of the block auxiliary groove.

* * * * *